United States Patent Office 3,348,413
Patented Oct. 24, 1967

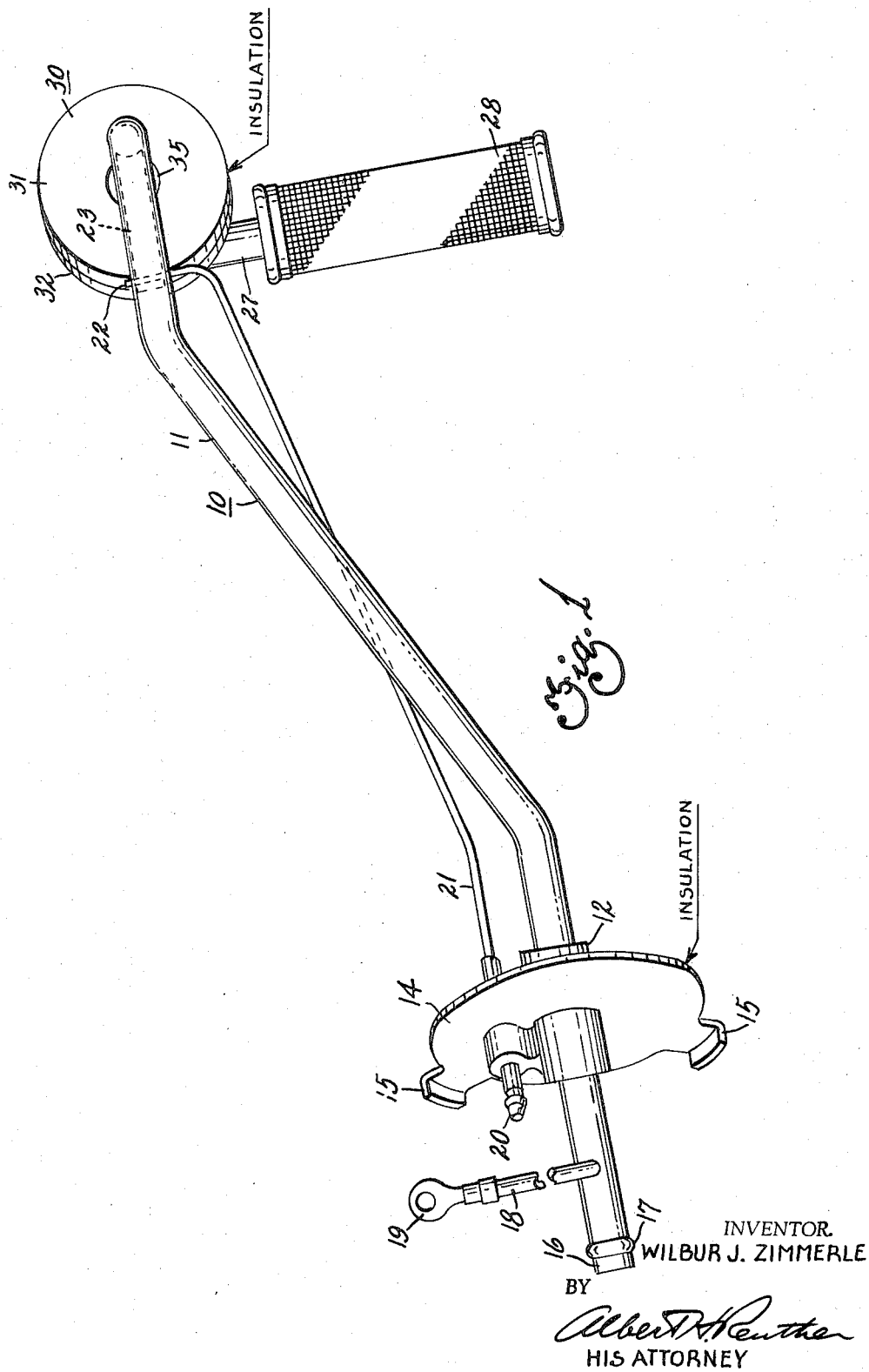

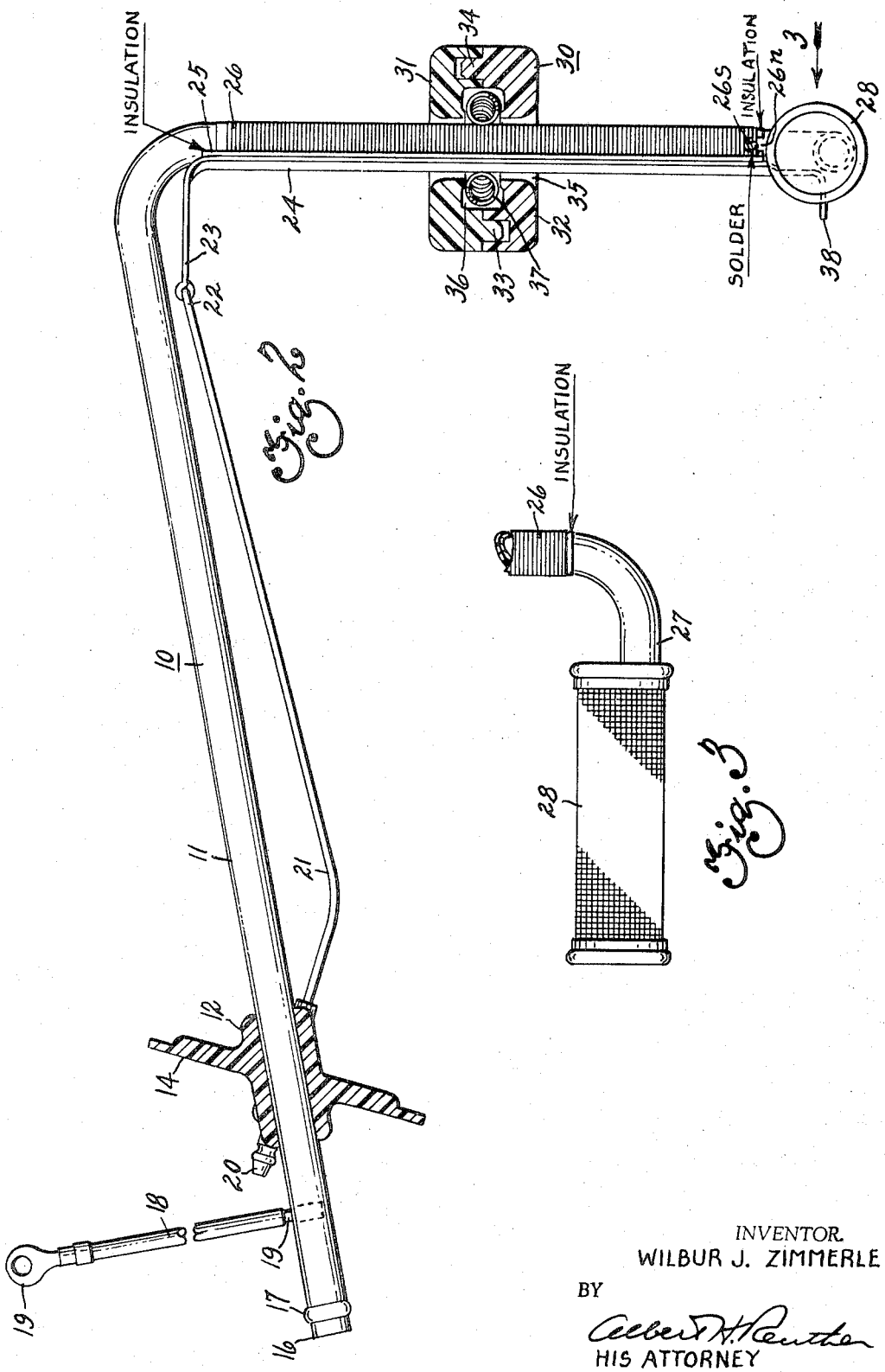

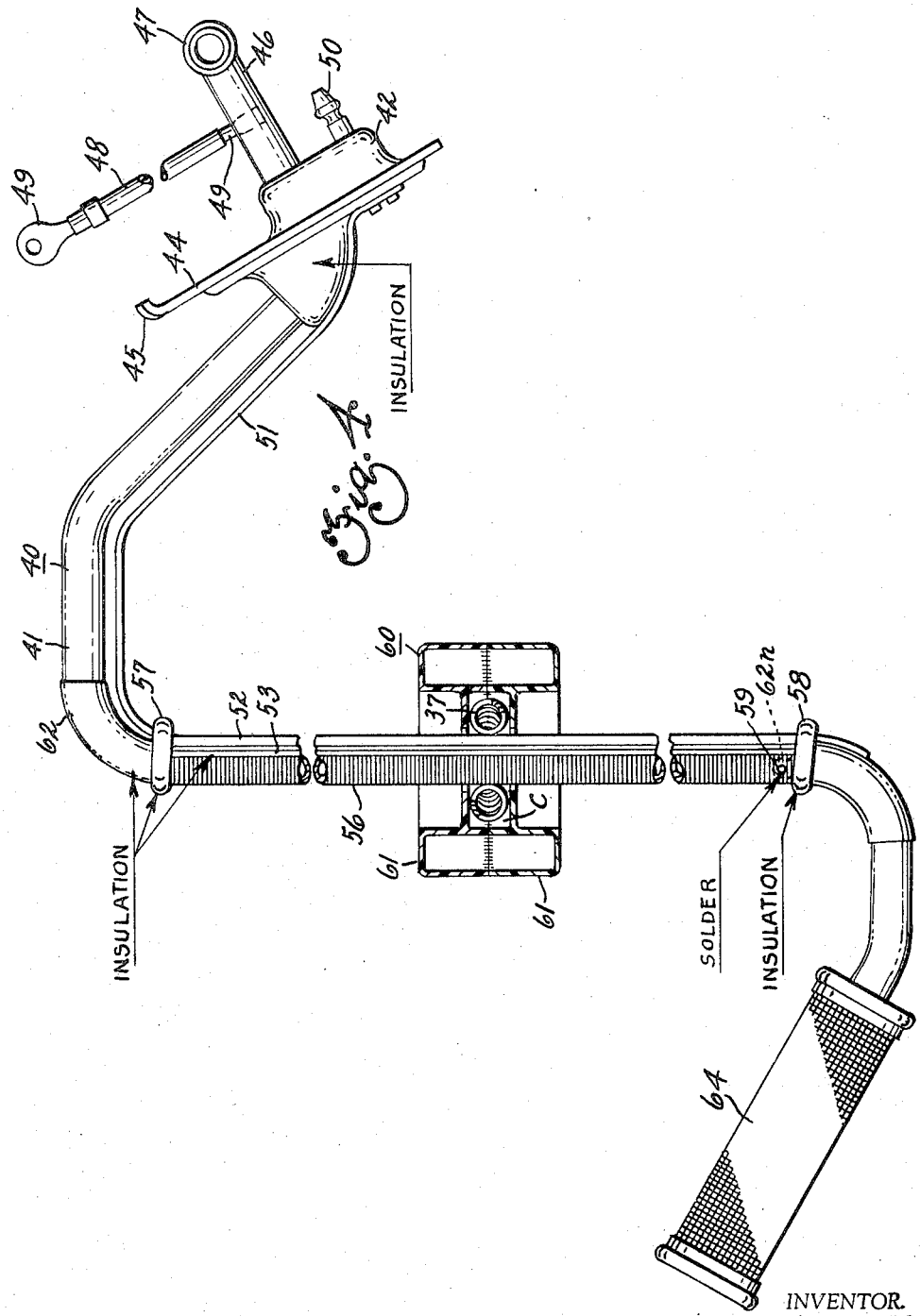

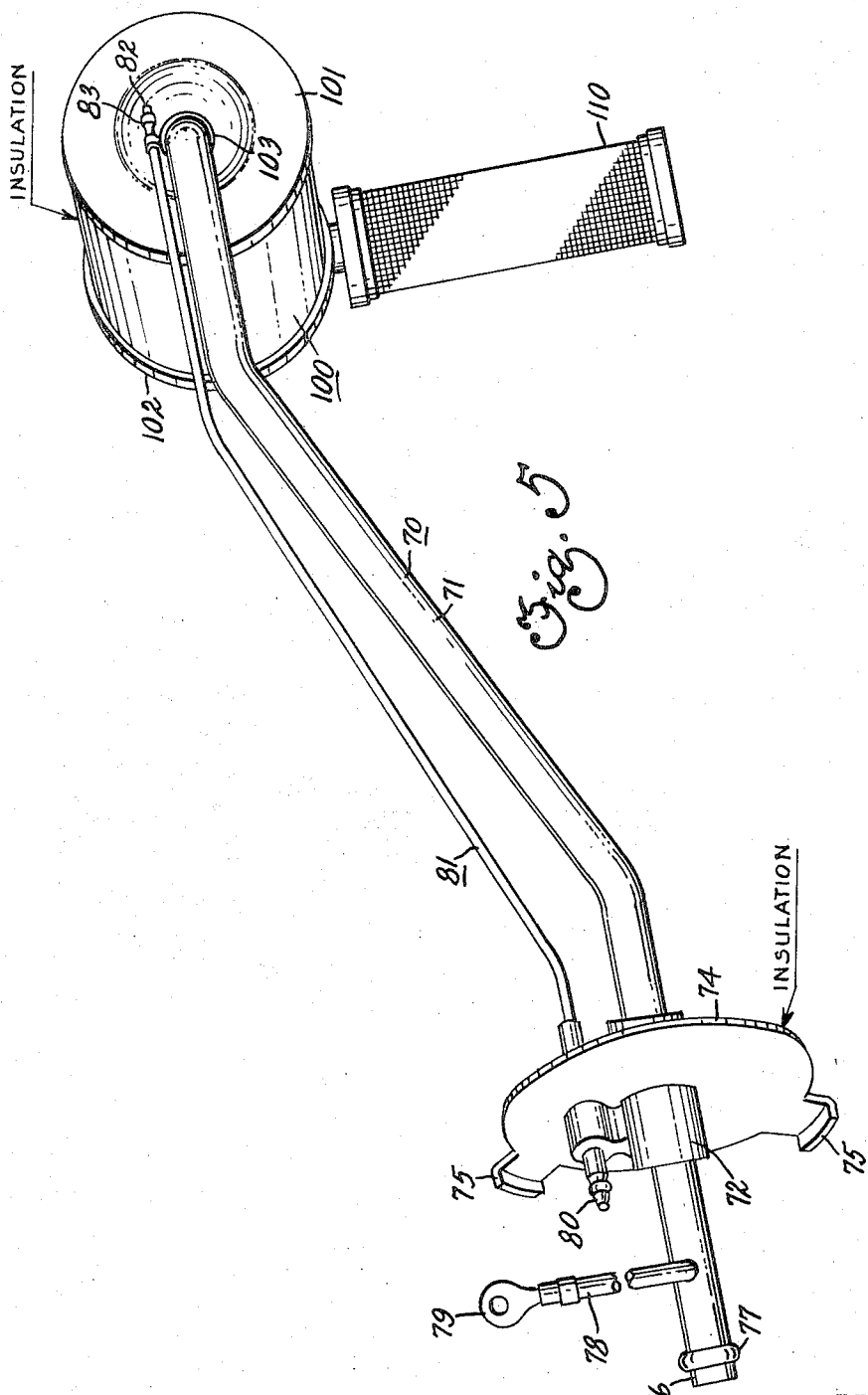

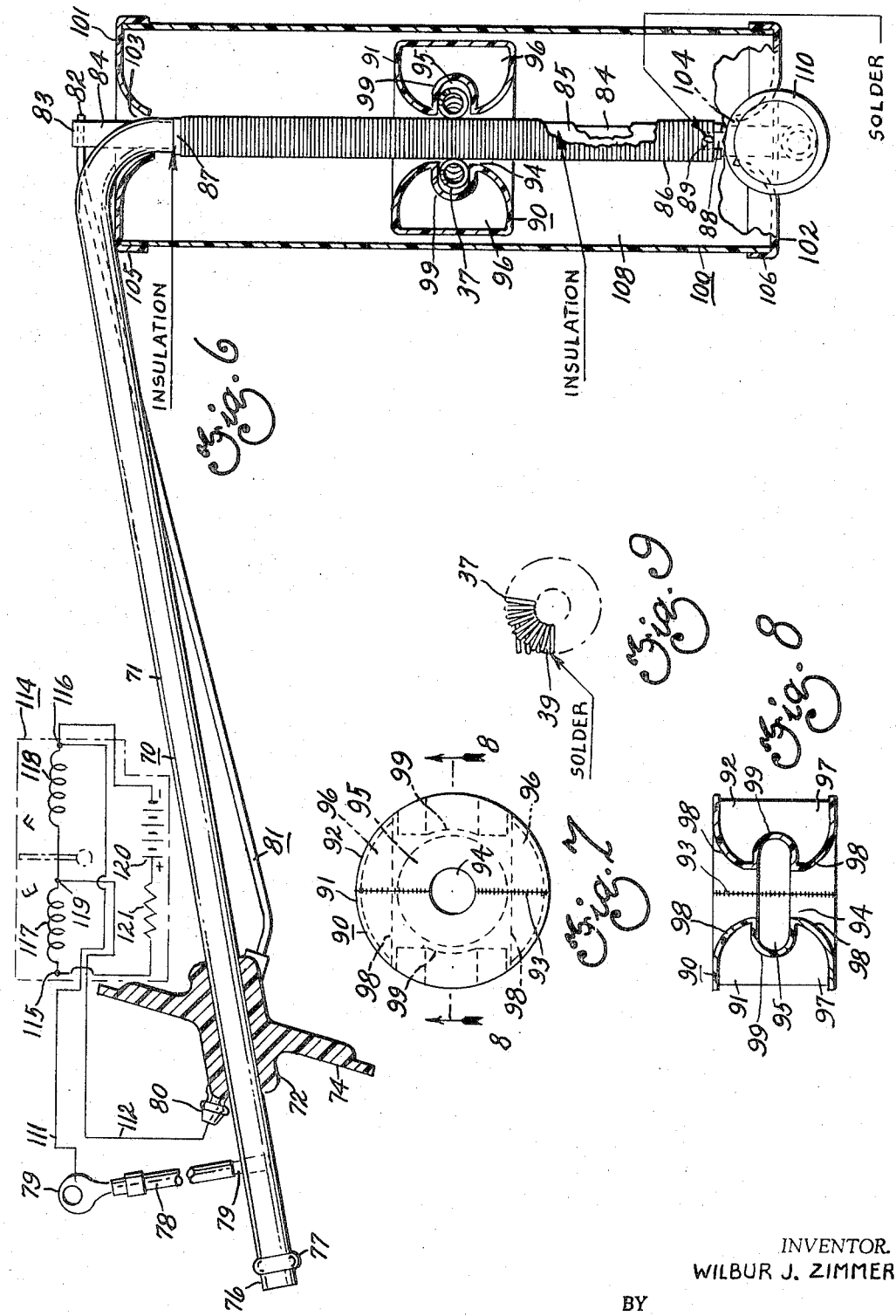

3,348,413
LINEAR FUEL LEVEL GAUGE MEANS
Wilbur J. Zimmerle, Dayton, Ohio, assignor to General Motors Corporation, Detroit, Mich., a corporation of Delaware
Filed Dec. 10, 1964, Ser. No. 417,266
2 Claims. (Cl. 73—313)

ABSTRACT OF THE DISCLOSURE

A fuel level gauge sending unit wherein a float member carrying an annular spiral spring contact member of electrically conductive material is movable along a portion of the fuel intake probe about which is wound a resistance wire which is separated from a strip of conductive material by an elongated insulating member sandwiched therebetween. The annular spiral spring contact member establishes an electrical contact bridge between the resistance wire and the strip of conductive material.

---

This invention relates to means for linearly gauging liquid fuel level in a storage tank of a vehicle, and, more particularly, to improvements in assembly of a float portion including contact movement within a predetermined range more accurately and at less cost than previously provided.

Problems of fuel gauge indication and accuracy have long been encountered with various approaches being used to avoid difference in rates of change of readings when a storage tank is relatively full as compared with relatively empty or less full conditions. Also in recent years, it has been noted that with fewer baffle means inside storage tanks there is a tendency for road shocks and vehicle movement to influence fuel gauge readings in a way to cause uncertainty and possible misinterpretation of indications of fuel available.

Accordingly, it is an object of the present invention to provide a new and improved float and contact means movable linearly over wound wire resistance means carried along an intermediate portion of a hollow tubular means having an elbow-shaped configuration with a mounting plate angularly secured adjacent to one end thereof and a filter means at an opposite end, the contact means per se being an annularly coiled spring means retained within confines of a plastic float means.

Another object of this invention is to provide a new and improved float and contact means movable linearly over wound wire resistance means carried along an intermediate portion of a hollow tubular means having an elbow-shaped configuration with a mounting plate angularly secured adjacent to one end thereof and a filter means at an opposite end, the contact means per se being an annularly coiled spring means retained within confines of a plastic float means which is made of complementary sections of plastic foam material to retain the annularly coiled spring means thereby for traversing the wound wire resistance means.

Another object of this invention is to provide a new and improved float and contact means movable linearly over wound wire resistance means carried along an intermediate portion of a hollow tubular means having an elbow-shaped configuration with a mounting plate angularly secured adjacent to one end thereof and a filter means at an opposite end, the contact means per se being an annularly coiled spring means retained within confines of a plastic float means made of complementary sections of plastic material to retain annularly coiled spring means thereby for traversing the wound wire resistance means having laterally outwardly extending annular stops at opposite ends thereof engageable by the plastic float means.

A further object of this invention is to provide a float assembly for a linear fuel level gauge means having a wire-covered tubular probe engaged by an annularly coiled spring means retained by a pair of identical half sections of plastic material centrally recessed and hollow inside with a seal edging juncture therebetween.

Another object of this invention is to provide a float assembly for a linear fuel level gauge means having a wire-covered tubular probe engaged by an annularly coiled spring means retained by a pair of identical half sections of plastic material centrally recessed and hollow inside with a seal edging juncture therebetween and movable within a cylindrical member apertured adjacent to a lower end thereof to admit liquid fuel therein though shielding against erratic jumping of the float assembly due to sudden up and down liquid fuel movement as well as defining limits of float assembly movement.

Further objects and advantages of the present invention will be apparent from the following description, reference being had to the accompanying drawings wherein preferred embodiments of the present invention are clearly shown.

In the drawings:

FIGURE 1 is a plan view of a fuel gauge assembly having features in accordance with the present invention.

FIGURE 2 is a partially sectioned side view of the assembly of FIGURE 1.

FIGURE 3 is a fragmentary side view taken in the direction of arrow 3 in FIGURE 2.

FIGURE 4 is a partially sectioned side view of another fuel gauge assembly having further features in accordance with the present invention.

FIGURE 5 is a plan view of a further fuel gauge assembly having features in accordance with the present invention.

FIGURE 6 is a partially sectioned side view of the assembly of FIGURE 5.

FIGURE 7 is a plan view of float means per se used in the assembly of FIGURES 5 and 6.

FIGURE 8 is a cross-sectional view taken along line 8—8 in FIGURE 7.

FIGURE 9 is a plan view of an annularly coiled spring contact means for use in the assemblies of FIGURES 1–8 inclusive.

Referring to FIGURE 1, there is shown a linear fuel level gauge means generally indicated by numeral 10. This gauge means 10 includes a hollow tubular member 11 having a substantially elbow shaped configuration as can be best seen in FIGURE 2. The tubular member 11 carries mounting plate portion of insulating material including a sleeve 12 on the tubular member and angularly though laterally extending covering 14 therewith. A pair of locking tabs or projections 15 shown in FIGURE 1 can be for securing a subassembly of the tubular member and plate-covering portion to a fuel storage means. An ending 16 of the tubular member 11 has a laterally flared annular abutment 17 to which a fuel line fitting can be attached in a well known manner. An insulating covering 18 over a grounding wire 19 attached at the tubular ending 16 by a suitable soldering operation serves to establish one side of electrical circuitry for the linear fuel level gauge means in accordance with the present invention. An opposite electrical connection is established by a terminal means 20 projecting through the covering 14 to one side of the sleeve portion 12 and having a conducting means 21 electrically in engagement therewith. An end 22 of this conducting means is engaged by a lateral link 23 crimped to the end 22. The link 23 is integral with a curved strip means 24 contoured to complement an insulating strip 25 between inner concave periphery of the strip means 24 and resistance wire means 26 wrapped uniformly and spirally over insulation along a lower elbow portion of the tubular means 11 as can be best seen in the view of FIGURE 2. Soldering 26s at a notch 26n of insulation connects several turns of wiring 26 to the tubular member 11 electrically. Strip means 24 is energized from a suitable power source such as vehicle ignition means or battery circuit. The strip means 24 is not directly connected to wiring means 26 and electrical interconnection therebetween results from engagement of a spring contact member carried by float means described subsequently.

As can be seen in FIGURES 2 and 3, a lower end 27 of the tubular means 11 has a filter means 28 pressed thereon so that fuel can be removed such as by a fuel pump means and caused to pass centrally through the tubular member 11.

A plastic float means 30 shown in views of FIGURES 1 and 2 includes complementary telescopically-fitted upper portion 31 and lower portion 32 thereof together with a dove tail flange means 33 and 34 shown in FIGURE 2. Collectively, the upper and lower portions 31 and 32 of the float means 30 form a central passage 35 including a laterally outwardly extending recessing 36 in which an annular coiled spring contact means 37 is retained resiliently in engagement with the strip means 24 along one side and resistance wiring 26 along an opposite side. In each of linearly differing float positions, the contact means results in inclusion of only a predetermined amount of resistance wiring in electric circuitry for proportional indications. More resistance wiring is in circuit when a more filled condition is indicated. The strip means 24 provides a lower stop 38 for the float means and the lateral tab portion 23 provides an upper stop for the float means 30. The portions 31 and 32 of the float means 30 as illustrated in FIGURES 1 and 2 are made of a polymer foam material such as polyurethane or polystyrene. The annular coiled spring contact means 37 per se is shown in a plan view of FIGURE 9 and includes a soldering 39 at a location of intermeshed end turns tangentially engaged to have predetermined diameter internally and externally collectively formed by substantially sixty-two actual coil turns of spring wiring. Approximately, sixteen additional coils or turns of wiring can be utilized for the meshing of end turns tangentially to each other and an overall nickel plating can be provided to establish good electrical contact surfacing.

Such coiled annular spring contact means 37 is also shown in a fuel gauge assembly generally indicated by numeral 40 in FIGURE 4. This assembly 40 includes a tubular member 41 having a sleeve-like body portion 42 with an integral plate 44 extending laterally outwardly to mounting tabs 45 provided adjacent to one end thereof in a manner similar to that illustrated in views of FIGURES 1 and 2. An end 46 of the tubular member 41 has a fuel line mounting provision 47 as well as an insulation covering 48 on a grounding wire 49 as shown in FIGURE 4. A terminal means 50 is mounted with the sleeve-like covering portion and a crimping secures this terminal means to a flat ribbon-like strip means 51 fitted in spaced and insulated relationship to the tubular means 41. The strip means 51 follows the substantially L or elbow-shaped configuration of the tubular member 41. The strip means 51 includes a curved and contoured contact portion 52 separated by a similarly contoured insulating means 53 adjacent to a resistance wiring 56 spirally wrapped over insulation on the tubular portion 41. Annular insulating stops 57 and 58 are provided to extend laterally outwardly at opposite ends of the resistance wiring 56 having several turns joined by soldering 59 to tubular member 41 near stop 58. A plastic float means 60 having hollow complementary portions 61 provides a central cavity C for mounting of the annular coil spring contact means 37. This coil spring contact means 37 snugly engages and embraces the resistance wiring 56 as well as the contoured or curved strip portion 52. Positioning of the float means 30 and 60 for example in a location intermediate the opposite ends of the resistance wiring 26 or 56 respectively will result in a fuel gauge reading linearly proportional to the fuel level in a storage tank. A suitable insulating sleeve 62 is provided to separate the wiring 56 from the tubular portion 41 except for a notch 62n to permit soldering 59. A filtering means 64 is secured to a lower end of the tubular portion 41 so that fuel can be caused to pass centrally through the hollow tubular member 41. The float means 60 can also be made of a polymer foam material.

Another fuel gauge assembly having features in accordance with the present invention is designated generally by reference numeral 70 in views of FIGURES 5 and 6 of the drawings. A hollow tubular member 71 thereof has a sleeve-like insulating portion 72 mounted adjacent to one end thereof together with a covering or laterally extending plate portion 74 having mounting flanges 75 therewith. An ending 76 of the tubular member 71 has a laterally outwardly extending annular portion 77 for fuel line mounting as well as an insulating covering 78 for a grounding wire 79 secured to the ending 76 such as by soldering and the like. A terminal means 80 extends through the covering portion of insultaing material and has a conductor 81 secured thereto at one end and a ribbon or strip means crimp portion 83 secured to an opposite end 82 of the conductor 81. The crimp portion 83 is integral with a curved strip or ribbon means 84 secured over an insulating means 85 fitted complementary thereto. A resistance wiring 86 is spirally wound over an insulating sleeve 87 along the lower portion of the tubular member 71. A notch 88 extends axially into sleeve 87 where resistance wiring 86 is secured such as by soldering at a lower location 89 to the tubular member 71.

Further in accordance with the present invention, a float means generally indicated by numeral 90 and shown in further detail in views of FIGURES 7 and 8 of the drawings includes a pair of substantially identical half sections of hollow plastic 91 and 92 having complementary edges or fused edge juncturing 93 therebetween. These substantially identical half sections 91 and 92 have a substantially semi annular configuration. The juncture 93 of adhering edging can be established by suitable plastic adhesive means such as epoxy resin, ultrasonically-established plastic welding or heat-sealed fusion of the edging juncture 93. The half sections 91 and 92 of the float means 90 can be made of suitable irregularly shaped, rigid thermoplastic materials such as styrene, nylon, acetal resin as well as polycarbonate and other plastic compositions. Ultrasonic plastic welding is advantageous because no solvents, adhesives or heat are required and a quick fusion of the plastic edging can be established. Vibrations ultrasonically established in the plastic material result in fusion thereof and such plastic sonic welding equipment is commercially available.

Collectively, the plastic half sections 91 and 92 form a central passage 94 therethrough as well as radially outwardly extending annular recessing 95 in which annular coiled contact spring means 37 can again be mounted as illustrated in FIGURE 6. The float means 90 has a hollow interior 96 on opposite sides thereof defined by complementary recessing 97 to form substantially parallel wall portions 98 as well as curved contouring 99 which defines the recessing 95 for the spring means 37.

The float means 90 is reciprocally movable over the resistance wiring 86 engaged by the spring contact means 37 which also engages the curved strip means 84 all housed within a cylindrical member 100 having a top portion 101 and a bottom portion 102 with central openings 103 and 104 respectively. Outer periphery edging or flange portions 105 and 106 of the top and bottom coverings 101–102 can be snap fitted, press fitted or secured by bonding with adhesive, heat sealing or ultrasonic plastic welding to the opposite axial endings of the cylindrical member 100. Fuel can flow through the central openings 103 and 104 which establish a passage relative to the outer periphery of the tubular member 71. It is to be understood that an additional aperturing or passage can be provided radially intermediate the center and outer edges of the top and bottom covering portions 101 and 102 to facilitate controlled liquid fuel passage into the hollow interior 108 of the cylindrical member 100. This cylindrical member 100 shields the float means 90 against lateral splashing of fuel in a storage tank thereby avoiding erratic jumping of the float assembly due to sudden up and down liquid fuel movement. Also the top and bottom portions 101 and 102 of the cylindrical member 100 provide limits or stops for the float assembly movement. The inner edging 103 and 104 is curved and contoured radially inwardly to complement contouring of the float portions 91 and 92 for defining the central passage 94 noted earlier. A fuel filtering means 110 can be secured by press fit onto a lower end of the tubular member 71 and fuel means can thus be caused to pass through the hollow tubular member 71 as previously noted.

In FIGURE 6 there is also a representation of linear fuel gauge means connection by leads 111 and 112 from ground wire 79 and terminal 80 respectively to a dashboard unit or indicator means 114. The indicator means 114 has opposite terminals 115 and 116 between which a pair of coils 117 and 118 are connected. A juncture 119 exists between these coils. A vehicle power source or alternator ignition circuitry represented by a battery means 120 can be connected at one side to terminal 116 also having lead 111 connected thereto. It is to be understood that for operating purposes similar indicating means can be provided for use with each of the linear fuel gauge means illustrated in previous views of the drawings. During operation the coiled annular spring contact means 37 of each structure connects between or bridges electrically across energized strip means and resistance wiring. The strip means when energized from the power source never has direct connection to the linear fuel gauge means except for connection to spiral resistance wiring exclusively by the coiled contact means 37 which is movable axially thereof as carried by the float structure. The resistance wiring has ground connection to the tubular member only at soldering location at a lower end thereof. Several turns up to six in number of such wiring are soldered readily at the insulating notch location that provides a land due to flattened wire span across the notch. All the soldered turns or coils of wiring are shorted together so that the coiled spring contact means 37 can make good contact for empty point unit indication. The resistance wiring is connected near the bottom of the tubular member where grounded because grounding at the top rather than the bottom would result in backwards reading of the dashboard unit.

The dashboard unit coils 117 and 118 also have resistance values. A protective resistance 121 can be connected in series between power source 120 and terminal 115 to limit current to at least one or more coil portions effective for indicating purposes at the dashboard of a vehicle. The coils 117 and 118 are in series across terminals 115–116. One of coils can have twice the number of turns compared with the other so that when an "empty" fuel tank condition exists no resistance wiring of the gauge means is added electrically in series to one of the coils and proper dashboard warning indication can be ascertained accordingly. When the float contact means is in an uppermost or full location, all resistance wiring is added to that of coil 118 so that more current from the power source 120 can flow through coil 117 due to lower proportional resistance thereof as compared with coil 118 permitting greater deflection electrically of a needle or pin toward a "full" indication (FIGURE 6). Linearly proportional intermediate readings are received when the float contact means moves to positions representing variation in fuel storage levels resulting in total resistance change in series with coil 118 and current variation in coil 117 accordingly.

It is to be noted that the linear fuel level gauge means in accordance with the present invention require substantially fewer parts than lever-arm actuated float constructions previously used for motor vehicles. Thus an appreciable reduction in cost can be realized together with a linear and more accurate fuel level indication. The half sections 61 as well as 91 and 92 can be made of cellulose propionate or acetal resin involving polymerization of formaldehyde into unbranched polyoxymethylene chains of great length normally averaging more than 1000–$CH_2O$ units. The cylindrical member 100 can be made of high density polyethylene, cellulose propionate or polypropylene. The cylindrical member will also shield and protect the wiring on the probe or tubular member. The coiled annular contact spring means 37 assures proper engagement of the resistance wiring and ribbon or strip means at all times while resiliently damping against jiggling movement or faulty indication. The float means can also be made of epoxy foam material. However, the foam material must be capable of resisting fuel corrosion.

While the embodiments of the present invention as herein disclosed constitute perferred forms, it is to be understood that other forms might be adopted.

What is claimed is as follows:

1. A float assembly for a linear fuel level gauge comprising, an elbow shaped tubular fuel intake probe of conductive material having an intake filter adjacent one end thereof, a mounting flange adjacent the opposite end thereof and an electrical insulation covering along an intermediate portion thereof, a resistance wire spirally carried over said insulation covering, an elongated insulating member extending longitudinally over said resistance wire, a strip of conductive material fitted over said elongated insulation member, an electrical connection between said resistance wire and said tubular probe, an electrical connection for said strip of conducting material terminating in a terminal carried by said mounting flange, an electrical ground connection for said tubular probe and a float member movable along that portion of said tubular probe which carries said resistance wire carrying an annular spiral spring contact member of electrically conductive material in electrical engagement with each said resistance wire and said strip of conductive material for providing an electrical contact bridge therebetween.

2. The assembly of claim 1 wherein annular outwardly extending insulating ring means located at opposite ends of said resistance wire can be engaged as stops for said float member.

References Cited

UNITED STATES PATENTS

| 87,959 | 3/1869 | Nesmith et al. | 73—306 |
| 2,298,954 | 10/1942 | Marchment | 73—313 X |
| 2,592,929 | 4/1952 | Matchett | 73—313 |
| 3,113,282 | 12/1963 | Coleman | 338—33 |
| 3,266,312 | 8/1966 | Coleman et al. | 210—86 X |

FOREIGN PATENTS

| 211,422 | 10/1957 | Australia. |
| 173,071 | 12/1921 | Great Britain. |
| 366,150 | 2/1932 | Great Britain. |
| 732,835 | 6/1955 | Great Britain. |

LOUIS R. PRINCE, *Primary Examiner.*

D. M. YASICH, *Assistant Examiner.*